(12) United States Patent
Yokomori

(10) Patent No.: US 7,151,323 B2
(45) Date of Patent: Dec. 19, 2006

(54) CONTROL METHOD OF SLIDING A VEHICLE DOOR BY A POWERED SLIDING DEVICE

(75) Inventor: Kazuhito Yokomori, Yamanashi-ken (JP)

(73) Assignee: Mitsui Kinzoku Kogyo Kabushiki Kaisha, Tokyo (JP)

( * ) Notice: Subject to any disclaimer, the term of this patent is extended or adjusted under 35 U.S.C. 154(b) by 164 days.

(21) Appl. No.: 10/284,441

(22) Filed: Oct. 31, 2002

(65) Prior Publication Data

US 2004/0042144 A1    Mar. 4, 2004

(30) Foreign Application Priority Data

Oct. 31, 2001   (JP) .............................. 2001-335298

(51) Int. Cl.
*H02G 3/00*      (2006.01)
*B60J 5/06*      (2006.01)
(52) U.S. Cl. ........................................ 307/9.1; 296/155
(58) Field of Classification Search ................ 307/9.1; 296/155, 15
See application file for complete search history.

(56) References Cited

U.S. PATENT DOCUMENTS 5,076,016 A * 12/1991 Adams et al. ................ 49/360
5,708,338 A * 1/1998 Cook et al. .................. 318/466
5,813,282 A * 9/1998 Azuma ....................... 74/89.22
5,833,301 A * 11/1998 Watanabe et al. ........... 296/155
5,913,563 A * 6/1999 Watanabe et al. ........... 296/155
6,037,727 A * 3/2000 Kawanobe et al. ......... 318/286
6,198,242 B1* 3/2001 Yokomori et al. .......... 318/445
6,359,762 B1  3/2002 Yokomori
6,525,499 B1* 2/2003 Naganuma ................... 318/445
6,863,336 B1* 3/2005 Yokomori et al. .......... 296/155

FOREIGN PATENT DOCUMENTS

JP          11-301271          11/1999

\* cited by examiner

*Primary Examiner*—Brian Sircus
*Assistant Examiner*—Hal I. Kaplan
(74) *Attorney, Agent, or Firm*—Browdy and Neimark, PLLC

(57) ABSTRACT

A control method of a powered sliding device for a vehicle sliding door, wherein when an operating switch is operated, a buzzer is sounded, and at the same time, a motor is rotated until a clutch mechanism is switched to a connected state from a disconnected state, and after the stopping of the buzzer, the sliding movement of the sliding door is started by the power of the motor.

4 Claims, 6 Drawing Sheets

CONTROL METHOD OF SLIDING A VEHICLE DOOR BY A POWERED SLIDING DEVICE

BACKGROUND OF THE INVENTION

1. Field of the Invention

The present invention relates to a control method of a powered sliding device for a vehicle sliding door.

2. Description of the Related Art

Conventionally, a powered sliding device for a vehicle sliding door where the sliding door is slid in the door closing direction and in the door opening direction by rotating a wire drum connected through a wire cable to the sliding door with the power of a motor is well known, and it is arranged that the power of the motor is transferred to the wire drum through a clutch mechanism.

In the clutch mechanisms, there are an electric (electromagnetic) type clutch using a solenoid (refer to Japanese Patent Application Laid-Open No. 11-301271) and a mechanical type clutch using a mechanical mechanism (refer to U.S. Pat. No. 6,359,762). The mechanical type clutch mentioned here means a mechanism where the connection and the disconnection of the clutch are performed by the power of a motor which slides the sliding door.

Generally, the mechanical type clutch can be manufactured to be light in weight at a low cost when compared with the electromagnetic type clutch, but on the other hand, it has a disadvantage of slow reaction. In the case of the electromagnetic type clutch, the connection of the clutch can be performed approximately simultaneously with the application of the power, but in the case of the mechanical type clutch, a time-lag of a little less than 0.5 sec is caused since the input of the power until the connection of the clutch. This time has been a sufficient time for giving the user a confusion of a moment.

SUMMARY OF THE INVENTION

Therefore, it is an object of the present invention to provide a control method wherein the time-lag of a mechanical type clutch which is felt by the user when opening and closing a sliding door is reduced.

DESCRIPTION OF THE PREFERRED EMBODIMENT

Figure 1:
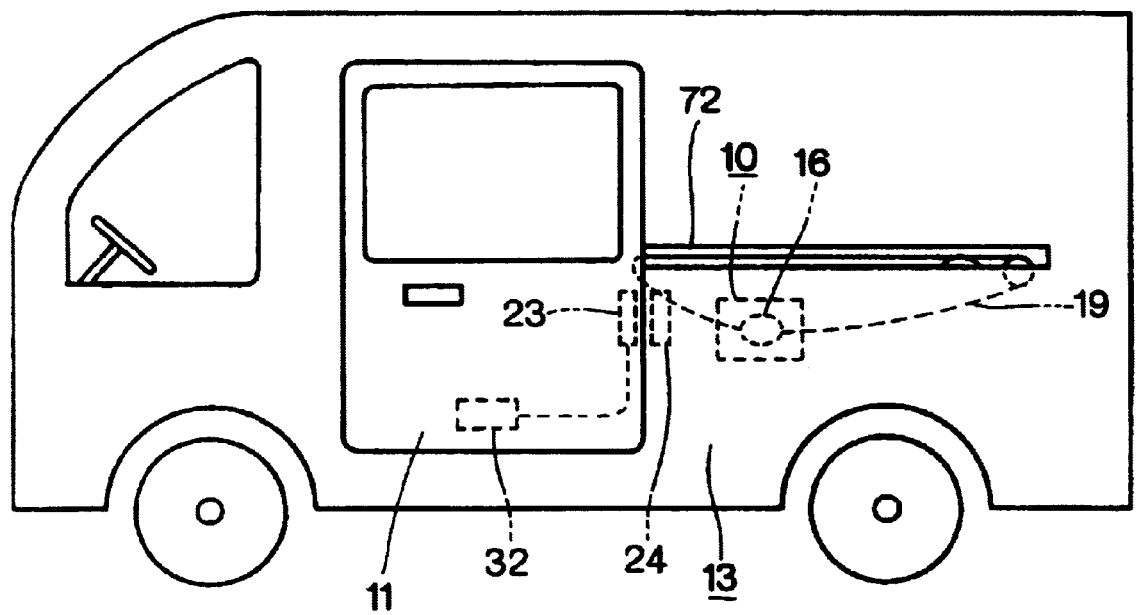
FIG. 1 is a side view of a vehicle with a powered sliding device and a sliding door.
Figure 2:
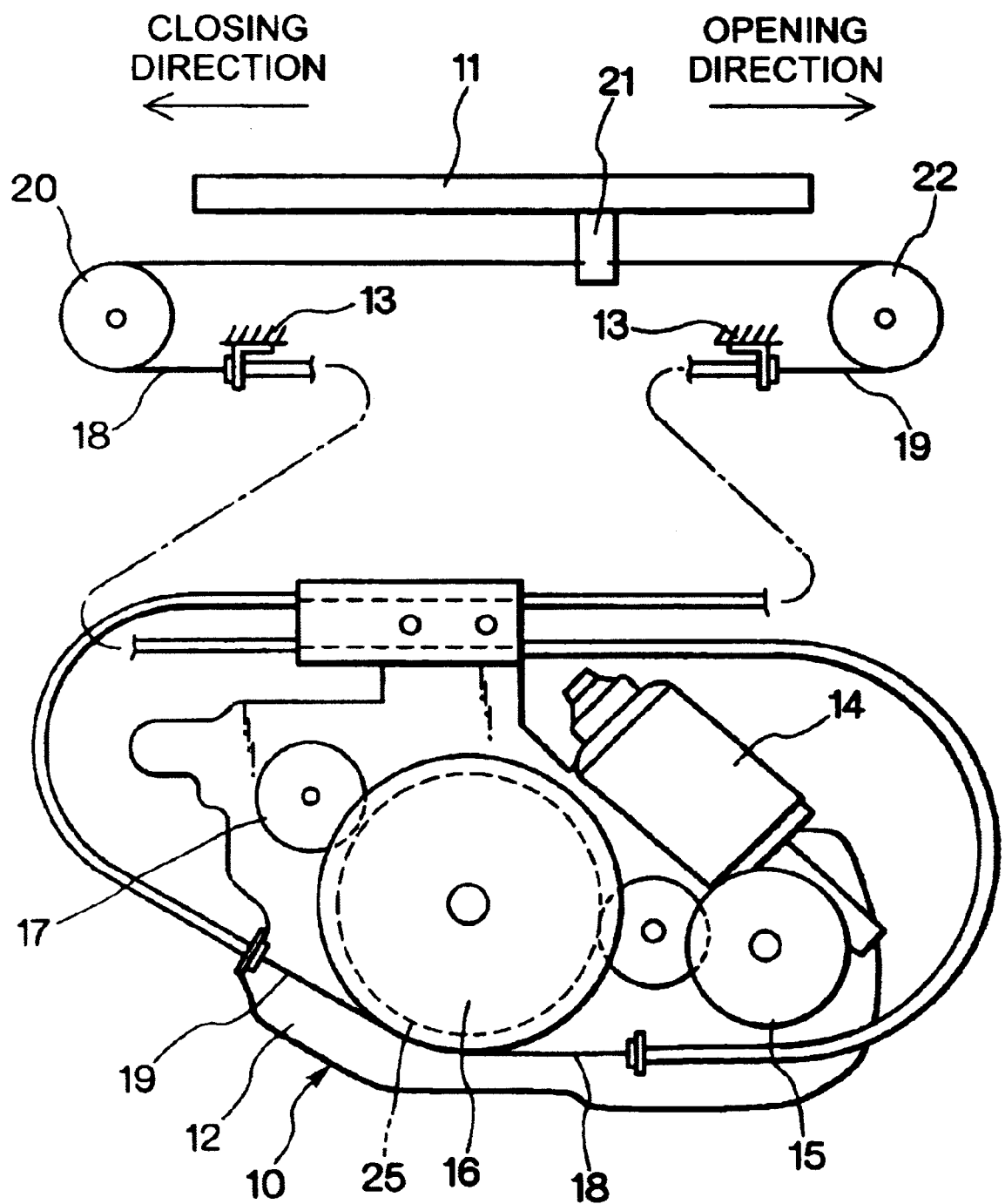
FIG. 2 is an expanded view of the sliding device and the sliding door.

One embodiment of the present invention will be described by using drawings. FIG. 1 shows the rough relation between a powered sliding device 10 according to the present invention and a vehicle sliding door 11 which is slidable in the door closing direction and in the door opening direction by the powered sliding device 10, and FIG. 2 shows the expanded relation between them.

The sliding door 11 is slidably attached to a vehicle body 13, and slides in the back and forth direction of the vehicle body 13 along a guide rail 72 provided to the vehicle body 13. The sliding device 10 has a motor 14, a reduction mechanism 15, a wire drum 16, and an electromagnetic brake 17, and these are attached to a base plate 18 fixed to the vehicle body 12. The electromagnetic brake 17 is operated by the electric control, and applies braking to the wire drum 16.

To the wire drum 16, one end sides of two wire cables 18, 19 are connected. The other end side of the first wire cable 18 is connected to a bracket 21 of the sliding door 11 through a front pulley 20 pivoted to the vehicle body 13. Similarly, the other end side of the second wire cable 19 is connected to the bracket 21 through a rear pulley 22 pivoted to the vehicle body 13.

Between the reduction mechanism 15 and the wire drum 16, a mechanical type clutch mechanism 25 is provided, and the rotation of the motor 14 is transmitted to the wire drum 16 through the reduction mechanism 15 and the clutch mechanism 25. The mechanical type clutch mechanism 25 is switched from the disconnected state to the connected state by the power of the motor 14 for sliding the sliding door 11 (refer to U.S. Pat. No. 6,359,762). In the case of the mechanical type clutch, the time of being switched from the disconnected state to the connected state by the power of the motor 14 mainly depends on the rotational speed of the motor 14, and it is generally about 0.3 to 0.5 sec.

When the wire drum 16 rotates clockwise by the power of the motor 14, the first wire cable 18 is wound up, and at the same time, the second wire cable 19 is pulled out, and the sliding door 11 is slid in the door closing direction, and by the counterclockwise rotation of the wire drum 16, the second wire cable 19 is wound up, and at the same time, the first wire cable 18 is pulled out, and the sliding door 11 is slid in the door opening direction.

Figure 3:
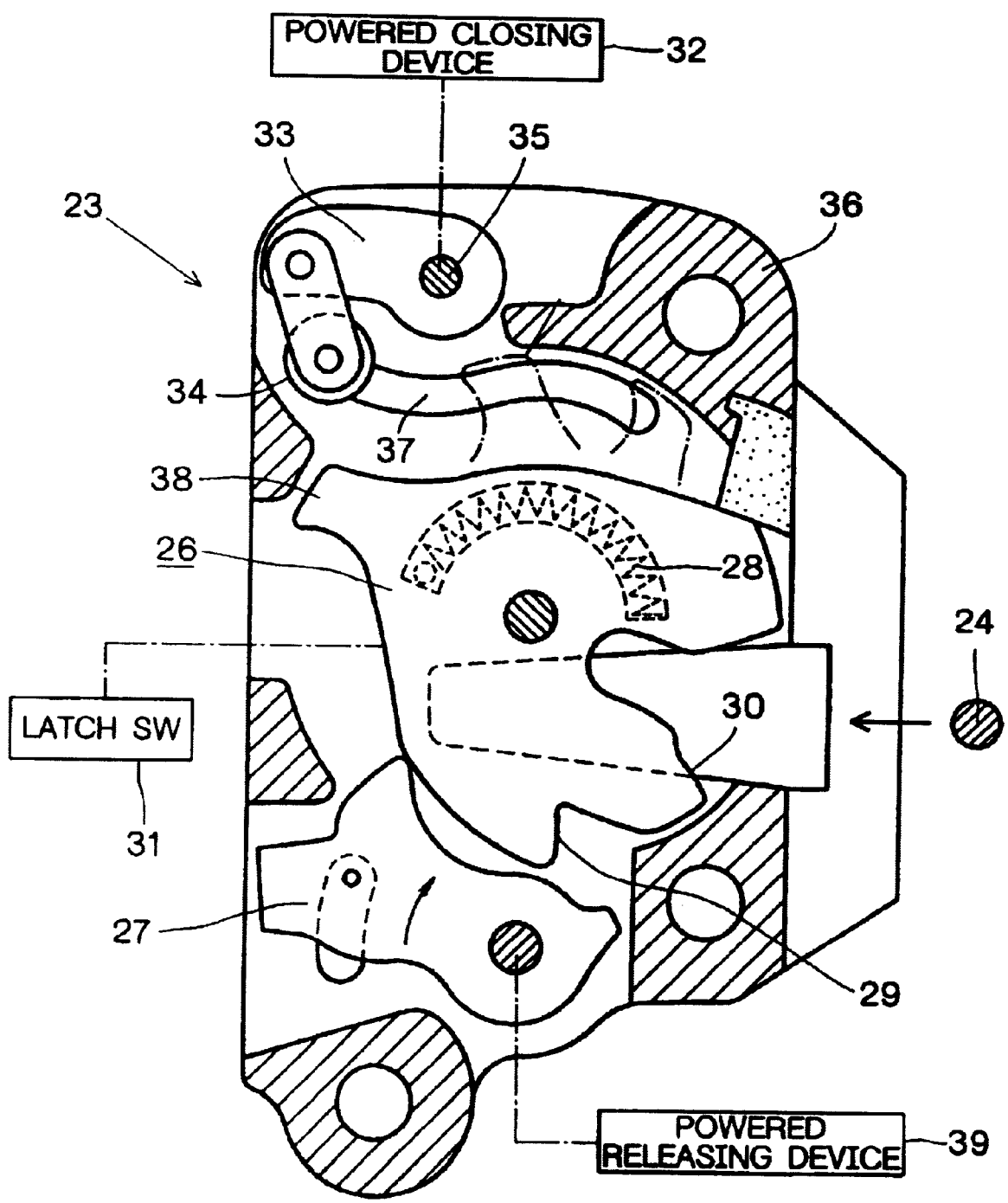
FIG. 3 is a sectional view of a latch assembly.

To the sliding door 11, a latch assembly 23 for keeping the sliding door 11 at the door-closed position. To a latch body 36 of the latch assembly 23, as shown in FIG. 3, a latch 26 to be engaged with a striker 24 fixed to the vehicle body 13 and a ratchet 27 to be engaged with the latch 26 are pivoted. The latch 26 is urged in the counterclockwise direction by the elasticity of a latch spring 28, and the ratchet 27 is urged in the clockwise direction by the elasticity of a ratchet spring (not shown). When the sliding door 11 moves in the door closing direction, the latch 26 comes into contact with the striker 24, and rotates from the door-open position (unlatched position) shown by the solid line through the half-latched position where the ratchet 27 is engaged with a half-latch step part 29 of the latch 26 to the full-latched position shown by the dotted line where the ratchet 27 is engaged with a full-latch step part 30 of the latch 26. When the latch 26 is positioned in the full-latched position and the ratchet 27 is engaged with the full-latch step part 30, the sliding door 11 is completely closed.

The latch assembly 23 has a latch switch 31 for detecting the position of the latch 26. The latch switch 31 is turned on when the latch 26 is rotated up to a predetermined position (hereafter, referred to as a succeeding point) from the unlatched position by the engagement with the striker 24. The timing of turning on of the latch switch 31 is the moment when the latch 26 is initially engaged with the striker 24 and is the moment before the latch 26 is positioned in the half-latched position.

The latch assembly 23 has a motor type powered closing device 32 which operates when the latch switch 31 is turned on, and the output of the powered closing device 32 is transferred to a driving lever 33. To the driving lever 33, a pressing part 34 is attached, and when the driving lever 33 is rotated counterclockwise about a support shaft 35 by the power of the closing device 32, the pressing part 34 moves to the right along a guide groove 37 of the latch body 36. At the moment when the closing device 32 operates, the latch 26 is positioned at the succeeding point where it is initially engaged with the striker 24, and therefore, the pressing part 34 moved to the right comes into contact with a latch leg part 38 of the latch 26, and rotates the latch 26 to the full-latched position by the power of the closing device 32, and completely closes the sliding door 11.

The latch assembly 23 has a powered releasing device 39 for releasing the ratchet 27 from the latch 26.

Figure 4:
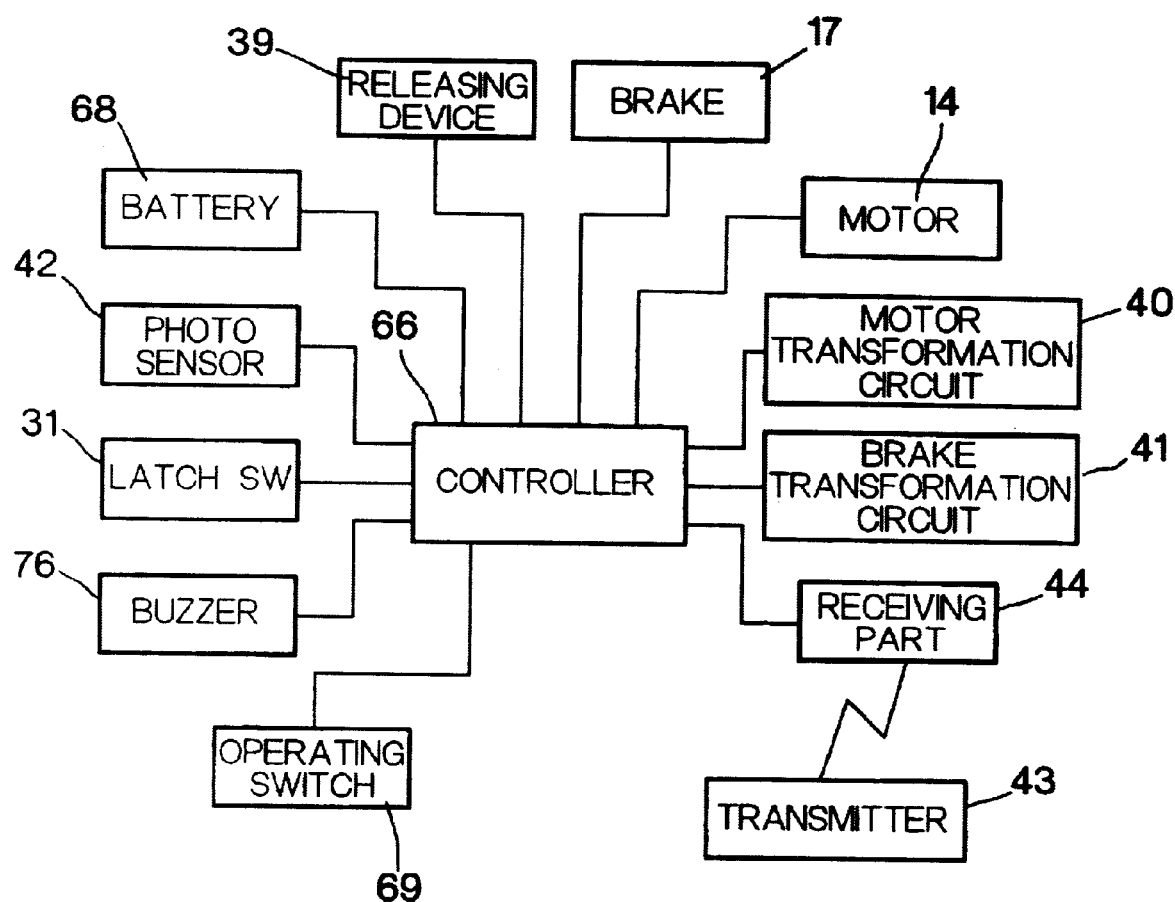
FIG. 4 is a block diagram for performing the control operation of the present invention.

FIG. 4 is a diagram of a block diagram for performing the control operation according to the present invention. The block diagram has a controller 66, an infrared or radio wave type portable transmitter 43 for the remote control, a receiving part 44 to the transmitter 43, a battery 68 mounted on the vehicle body 13, an operating switch 69, and a buzzer 76.

The block diagram further has a motor transformation circuit 40 for controlling the output of the motor 14 by the PWM control (DUTY control), a brake transformation circuit 41 for controlling the braking force of the electromagnetic brake 17 by the PWM control (DUTY control), and a photo sensor 42 for detecting the rotational amount, rotational speed, and rotational direction of the wire drum 16. The controller 66 can find the sliding amount, sliding speed, and sliding direction of the sliding door 11 by signals from the photo sensor 42.

OPERATIONS (Door Opening by Operating Switch 69)

Figure 5:
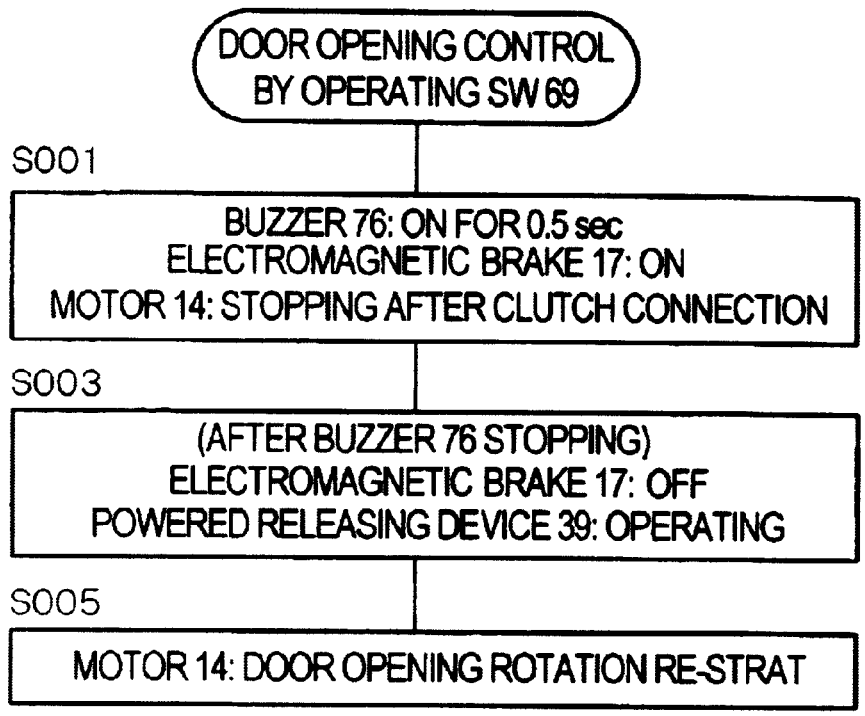
FIG. 5 is a flow chart showing the door opening control by an operating switch.

When the sliding door 11 is positioned in the door-closed position, if the operating switch 69 is operated to the door opening side, the door opening control in FIG. 5 is performed, and first, in the step S001, the controller 66 sounds the buzzer 76 to call the attention for telling the user the start of the powered door-opening, and simultaneously with this, turns on the electromagnetic brake 17, and rotates the motor 14 in the door opening direction. At this moment, the sounding time of the buzzer 76 is preferably about 0.5 sec, and this is generally determined by considering the time necessary as a notice buzzer, but it is set not to be shorter than the time (about 0.3 sec to 0.5 sec) necessary for the clutch mechanism 25 to be switched to the connected state from the disconnected state by the rotation of the motor 14. Furthermore, the braking force of the electromagnetic brake 17 is set to be weak (about 30% in Duty ratio).

Then, the clutch mechanism 25 is switched to the connected state by the door opening rotation of the motor 14 before the buzzer 76 stops sounding, and the rotation of the motor 14 is transmitted to the wire drum 16. At this moment, the wire drum 16 is rotated in the door opening direction by the rotation of the motor 14 since the restriction of the wire drum 16 by the electromagnetic brake 17 is set to be weak, and the drum rotation is detected by the photo sensor 42. Furthermore, at this step, the ratchet 27 is still engaged with the latch 26, and therefore, the sliding door 11 cannot move, but a little rotation is permitted to the wire drum 16 because of the looseness or the like of the wire cables 18, 19.

By the detection of rotation of the wire drum 16, the controller 66 can confirm the finish of switching operation to the connected state of the clutch mechanism 25, and by this, the motor 14 is stopped.

Next, when the buzzer 76 stops sounding, the control of the controller is passed to the step 003, and the electromagnetic brake 17 is turned off, and the ratchet 27 is released from the latch 26 by the powered releasing device 39, and the door opening rotation of the motor 14 is started again (S005), and the sliding door 11 is slid in the door opening direction.

Thus, when the operating switch 69 is operated to the door opening side, if the clutch mechanism 25 has been switched to the connected state while the buzzer 76 is sounding, the sliding door 11 quickly slides and moves by the door opening rotation of the motor 14 which is started again after the finish of the buzzer 76, and therefore, the door opening sliding of the sliding door 11 can be performed without making the user feel the time-lag necessary for the connection of the clutch mechanism 25.

(Door Opening by Transmitter 43)

Figure 6:
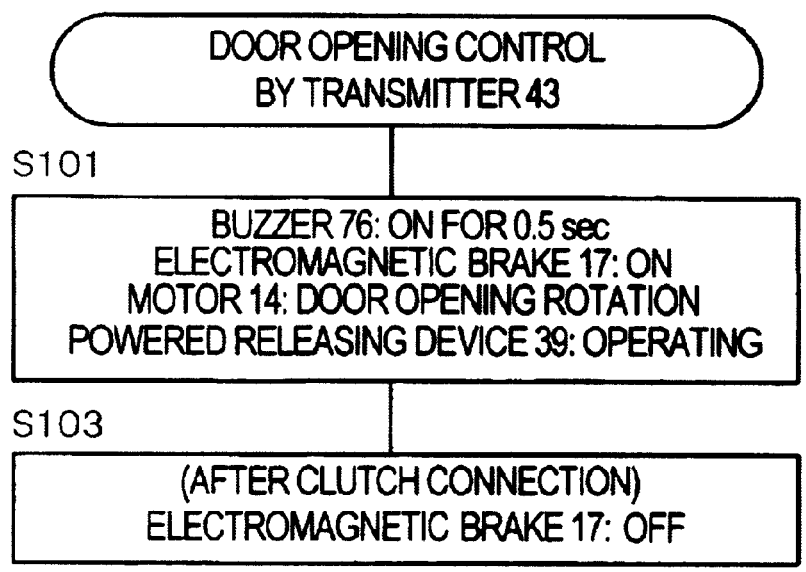
FIG. 6 is a flow chart showing the door opening control by a transmitter.

When the sliding door 11 is positioned at the door-closed position, if the transmitter 43 is operated to open the door, the door opening control in FIG. 6 is performed, and first, at the step 101, the controller 66 sounds the buzzer 76 to call the attention for telling the start of the powered door opening to the user, and simultaneously with this, turns on the electromagnetic brake 17, and rotates the motor 14 in the door opening direction, and together with this, releases the ratchet 27 from the latch 26 by the powered releasing device 39. At this moment, the sounding time of the buzzer 76 is preferably about 0.5 sec.

Then, the clutch mechanism 25 is switched to the connected state by the door opening rotation of the motor 14 before the buzzer 76 stops sounding, and the rotation of the motor 14 is transmitted to the wire drum 16. At this moment, the wire drum 16 rotates in the door opening direction by the rotation of the motor 14 since the restriction of the wire drum 16 by the electromagnetic brake 17 is set to be weak, and the drum rotation is detected by the photo sensor 42. By the detection of the rotation of the wire drum 16, the controller 66 can confirm the completion of the switching operation to the connected state of the clutch mechanism 25, and by this, at the step 103, the electromagnetic clutch 17 is turned off, and the regular door opening sliding of the sliding door 11 is started.

Thus, when the transmitter 43 is operated to open the door, both the releasing of the ratchet 27 and the connection of the clutch mechanism 25 are performed together while the buzzer 76 is sounding, and after the connection of the clutch mechanism 25, the door opening sliding is started without waiting for the stopping of the sounding of the buzzer 76. The reason thereof is that it is judged that even if the sliding movement is started faster, the problem in the safety is small since the transmitter 43 is used outside the vehicle.

(Door Closing by Operating Switch 69)

Figure 7:
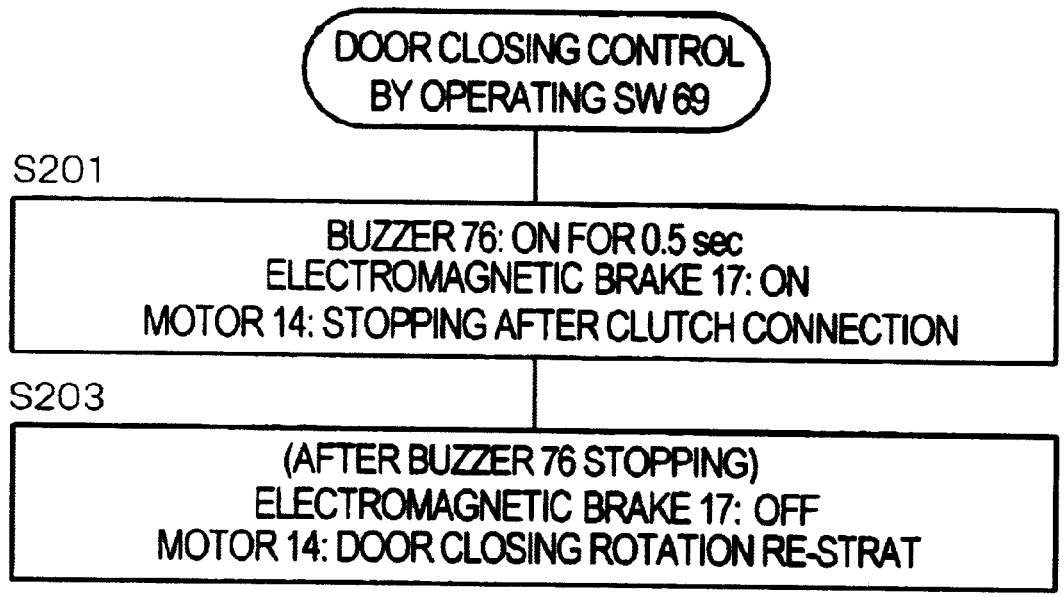
FIG. 7 is a flow chart showing the door closing control by an operating switch.

When the sliding door 11 is positioned at the door-open position, if the operating switch 69 is operated to the door closing side, the door closing control in FIG. 7 is performed, and first, at the step 201, the controller 66 sounds the buzzer 76 to call the attention for telling the user the start of the powered door closing, and simultaneously with this, turns on the electromagnetic brake 17, and rotates the motor 14 in the door closing direction. The sounding time of the buzzer 76 at this moment is preferably about 0.5 sec. Furthermore, the braking force to the electromagnetic brake 17 is set to be weak (about 30% in DUTY ratio).

Then, the clutch mechanism 25 is switched to the connected state by the door closing rotation of the motor 14 before the stopping of the sounding of the buzzer 76, and the rotation of the motor 14 is transmitted to the wire drum 16. At this moment, the wire drum 16 rotates in the door closing direction by the rotation of the motor 14 since the restriction of the wire drum 16 by the electromagnetic brake 17 is set to be weak, and the drum rotation is detected by the photo sensor 42. The controller 66 can confirm the completion of the switching operation to the connected state of the clutch mechanism 25 by the detection of the rotation of the wire drum 16, and by this, the motor 14 is stopped.

Next, if the buzzer 76 stops sounding, the control of the controller is passed to the step S203, and the electromagnetic brake 17 is turned off, and the door closing rotation of the motor 14 is re-started, and the sliding door 11 is slid in the door closing direction.

Thus, when the operating switch 69 is operated to close the door, if the clutch mechanism 25 has been switched to the connected state in advance while the buzzer 76 is sounding, the sliding door 11 quickly and actually slides and moves by the door closing rotation of the motor 14 to be re-started simultaneously with the finish of the buzzer 76, and therefore, the door closing sliding of the sliding door 11 can be performed without making the user feel the time-lag necessary for the connection of the clutch mechanism 25.

(Door Closing by Transmitter 43)

Figure 8:
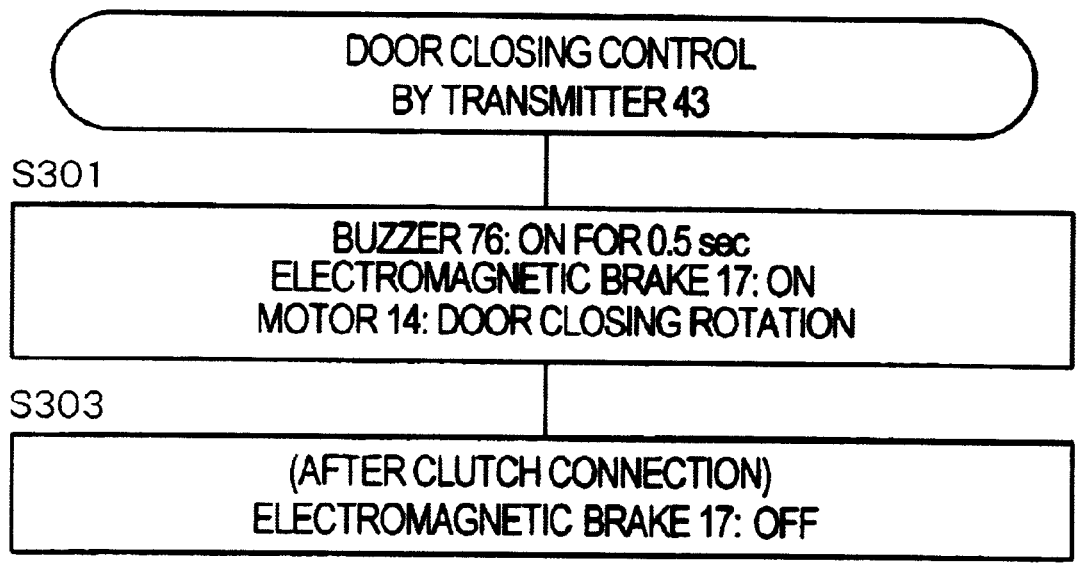
FIG. 8 is a flow chart showing the door closing control by a transmitter.

When the sliding door 11 is positioned in the door-open position, if the transmitter 43 is operated to close the door, the door closing control in FIG. 8 is performed, and first, at the step S301, the controller 66 sounds the buzzer 76 to call the attention to tell the user the start of the powered door closing, and simultaneously with this, the electromagnetic brake 17 is turned on, and the motor 14 is rotated in the door closing direction. The sounding time of the buzzer 76 at this moment is preferably about 0.5 sec.

Then, the clutch mechanism 25 is switched to the connected state by the door closing rotation of the motor 14 before the stopping of the sounding of the buzzer 76, and the rotation of the motor 14 is transmitted to the wire drum 16. At this moment, the wire drum 16 rotates in the door closing direction by the rotation of the motor 14 since the restriction of the wire drum 16 by the electromagnetic brake 17 is set to be weak, and the drum rotation is detected by the photo sensor 42. By the detection of the rotation of the wire drum 16, the controller 66 can confirm the completion of the switching operation to the connected state of the clutch mechanism 25, and by this, at the step 303, the electromagnetic clutch 17 is turned off, and the regular door closing sliding of the sliding door 11 is started.

Thus, when the transmitter 43 is operated to close the door, the connection of the clutch mechanism 25 is performed while the buzzer 76 is sounding, and after the connection of the clutch mechanism 25, the door closing sliding is started without waiting for the stopping of the sounding of the buzzer 76. The reason of this is that it is judged that even if the sliding movement is started more quickly, the problem in the safety is small since the transmitter 43 is used outside the vehicle.

ADVANTAGE

As mentioned above, according to the control method of the present invention, the time-lag necessary for the mechanical type clutch mechanism 25 to be switched to the connected state is absorbed while the buzzer which impels the safety to the user is sounding, and therefore, the sliding of the sliding door 11 can be performed without making the user feel the time-lag of the clutch mechanism 25.

What is claimed is:

1. A control method of a powered sliding device for a vehicle sliding door including a control means incorporating a mechanical clutch mechanism, comprising the steps of:
    sounding a buzzer when an operating switch is operated;
    rotating a motor until the mechanical clutch mechanism is switched to a connected state from a disconnected state during the sounding of the buzzer; and
    starting sliding movement of a sliding door by power of said motor after stopping of the buzzer.

2. The control method of a powered sliding device for a vehicle sliding door according to claim 1, wherein said motor is stopped when switching to the connected state from the disconnected state of said clutch mechanism by rotation of said motor is detected.

3. A control method of a powered sliding device for a vehicle sliding door including a control means incorporating a mechanical clutch mechanism, comprising
    operating a buzzer by engaging a switch to an "on" position;
    said switch further controlling the mechanical clutch mechanism to switch said mechanical clutch mechanism from a disconnected state to a connected state during sounding of said buzzer;
    said buzzer sounding for a minimum time of 0.3 seconds; and
    beginning sliding movement of said vehicle sliding door after said buzzer has stopped sounding.

4. The method of claim 3 wherein said switch in said "on" position turns on a motor, and said motor engages the mechanical clutch to switch the mechanical clutch from the disconnected state to the connected state after about 0.3 to 0.5 seconds.

* * * * *